United States Patent
Brown et al.

[15] 3,682,549
[45] Aug. 8, 1972

[54] IMAGING APPARATUS AND METHOD

[72] Inventors: Harvey A. Brown, East Oakdale Township, Washington County; Robert B. Jones, Ramsey County, both of Minn.

[73] Assignee: Minnesota Mining and Manufacturing Company, St. Paul, Minn.

[22] Filed: Aug. 19, 1968

[21] Appl. No.: 753,466

[52] U.S. Cl. ................................................355/132
[51] Int. Cl. ...........................................G03b 27/02
[58] Field of Search .....355/77, 107, 132, 133; 96/44

[56] References Cited

UNITED STATES PATENTS

| | | |
|---|---|---|
| 3,511,653 | 5/1970 | Wiebe ..........................96/44 |
| 3,510,305 | 5/1970 | Craig............................96/44 |
| 1,837,704 | 12/1931 | Dean..........................355/18 |
| 2,232,144 | 2/1941 | Sersen........................355/77 |

*Primary Examiner*—John M. Horan
*Attorney*—Kinney, Alexander, Sell, Steldt & Delahunt

[57] ABSTRACT

An imaging method and apparatus is described wherein a reduced, unreversed reproduction of a transparency image is produced on photographic negative film by forming a reversed image of the transparency image on a photoresponsive medium and then photographing the reversed image on photographic negative film.

15 Claims, 3 Drawing Figures

PATENTED AUG 8 1972

3,682,549

INVENTORS
HARVEY A. BROWN
ROBERT B. JONES
BY Kinney, Alexander,
Sell, Steldt & DeLaHunt
ATTORNEYS

IMAGING APPARATUS AND METHOD

In the field of image reproduction, processes are desired for simply and expeditiously producing reduced, unreversed reproductions of images which are recorded on transparent mediums. For example, it is desired to store reduced reproductions of medical radiographs on microfilm. The microfilm reproductions may be mounted on known aperture cards which are capable of being punched for permanently storing coded information in addition to the radiographs. Further, punched aperture cards may be easily stored and are capable of being retrieved by computer sorting techniques. It is highly desirable that the reduced radiograph reproductions on microfilm be unreversed reproductions in that radiologists prefer to view radiographs in negative form.

Methods for producing reduced positive and negative image reproductions are known to the art. One method, for example, involves a process wherein an image-bearing transparency is scanned by a beam of light, the light transmitted therethrough being converted into electrical signals modulating a second scanning light beam which exposes photographic negative film. Expensive equipment is required for this process, and image reproductions produced thereby are characterized by relatively poor resolution. Certain photographic films will produce unreversed image reproductions. Presently, however, such film images are grainy in character, require complicated development processes, or require excessive exposure periods, and generally are very expensive. Certain positive diazo processes may be utilized, but generally such processes are slow and exhibit image density limitations.

One known method of producing unreversed image reproductions involved the formation of a reduced, reversed reproduction of the transparency image on microfilm via an optical image reducing system, and then contact printing the reversed image onto silver halide photographic negative film. The apparatus and method required for this process requires a double film processing step which is cumbersome and time consuming.

Another known method for producing an unreversed reproduction of a transparency image involves a two-step photographing and developing process. In this two-step process, a photograph is made of a transparency image on photographic negative film to yield, upon development, a reversed image reproduction. The developed reversed image is then photographed on photographic negative film to yield, upon development, an unreversed image reproduction. Two consecutive development steps are required and the image can be reduced in either of the two steps.

Therefore, it is an object of the present invention to provide a method for producing a reduced, unreversed, transparency image reproduction requiring a single processing step.

Another object of the present invention is to provide an economical method for producing a reduced, unreversed transparency image reproduction.

Another object is to provide a method for producing a reduced, unreversed, transparency image reproduction characterized by controlled resolution and contrast.

Another object is to provide a method for economically producing a reduced, unreversed, transparency image reproduction through the use of an intermediate restorable photo-responsive medium.

A further object is to provide an apparatus for the production of a reduced, unreversed transparency image reproduction.

Briefly, the present invention relates to a process and apparatus for producing an unreversed reproduction of a transparency image. Actinic radiation is differentially transmitted through an original transparency image to impinge upon a photoresponsive medium. The reversed image is then optically reduced and reproduced as an unreversed reproduction of the transparency image of photographing the reversed image on photographic negative film.

As used herein, "transparency image" refers to an image-bearing, transparent sheet, the imaging and transparency materials being chosen to permit actinic radiation of at least one wavelength to be more readily transmitted through the non-imaged areas of the image-bearing transparency than through the imaged areas thereof;

"photochromic" refers to the capacity of a class of photoresponsive materials to undergo reversible-light or heat-induced color changes;

"unreversed" refers to correspondence between imaged areas of the copy and imaged areas of the original image;

"reversed image" refers to a copy of an original image wherein imaged areas of the copy correspond to non-imaged areas of the original image; and "photographic negative film" refers to photographic film upon which a reversed image is formed of a photographed image.

The present invention may be more easily understood by reference to the accompanying drawing wherein.

Figure 1:
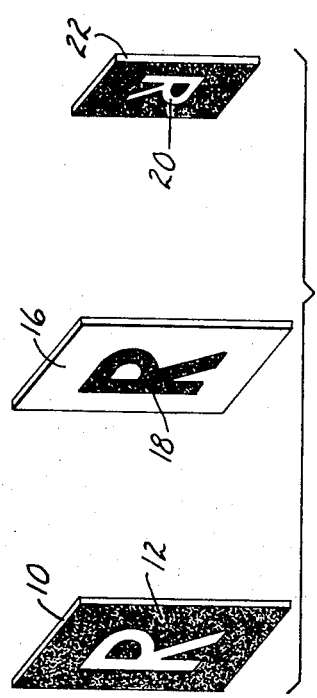
FIG. 1 is a diagrammatic representation of sequence of images in the process of the present invention.

Referring to FIG. 1, actinic radiation at a suitable wavelength strikes the original transparency 10 bearing imaging material 12, and is differentially transmitted therethrough according to the relative opacity of the transparency and imaging materials to impinge upon a photoresponsive medium 16, forming a reversed image 18 thereon. The reversed image 18 is then illuminated with actinic radiation at a wavelength to which the reversed image 18 is at least partially photoabsorptive, and a photograph 20 of reversal image 18 is made on photographic negative film 22 to produce, upon processing, a reduced, unreversed reproduction of the original transparency image.

Figure 2:
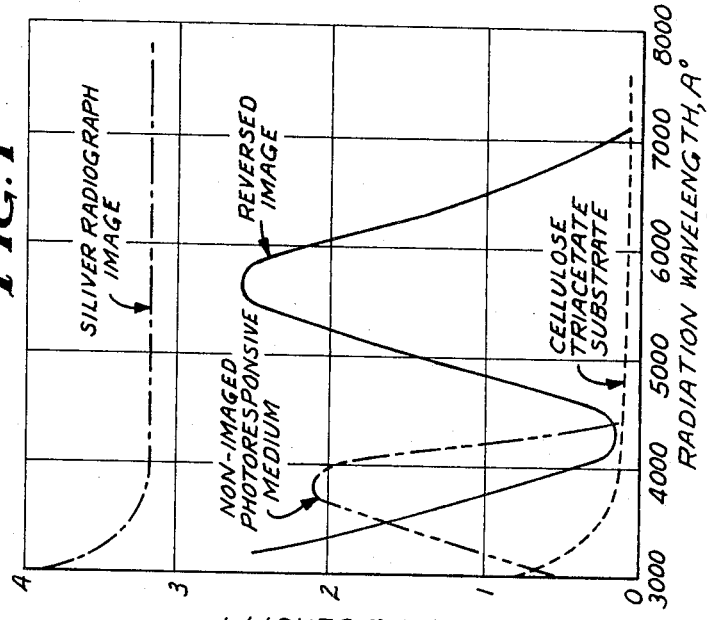
FIG. 2 is a graphic representation of typical relative opacities of a reversed image, a silver radiograph image and a common substrate film to varying wavelengths of actinic radiation.

The original transparency material 10 may be any material which is capable of transmitting at least one wavelength of actinic radiation. The transparency material 10 bears imaging material 12 which is less transparent to at least one wavelength of actinic radiation than is the transparency material 10. For example, the transparency material 10 may be cellulose triacetate, and the imaging material 12 thereon may be metallic silver. Cellulose triacetate film transmits actinic radiation at a wavelength of 3,660 A, but metallic silver does not transmit actinic radiation at this wavelength, as shown in FIG. 2. Should the photoresponsive medium 16 in addition be responsive to a wavelength of actinic radiation which is more freely transmitted by the imaging material 12 than is the desired wavelength of actinic radiation, an undesirable loss of contrast may result. This problem may be obviated by the judicious choice of materials and of the radiation source or by the use of filters selected to screen out actinic radiation at undesired wavelengths.

The transmissivity of a given area of transparency image to actinic radiation is dependent, within limits, upon the concentration of imaging material within the area. If more than one imaging material is employed, as for example in photographic color film, the actinic radiation transmissivity of a given area of the film will depend upon the relative transmissivities of the imaging materials contained within the given area.

Photoresponsive compositions are well known to the art. Such compositions, for example, are taught in U.S. Pat. Nos. 2.927,025; 3,342,595; and 3,359,109. Photochromic compositions are also well known, and are explained and exemplified in Noyes et al., *Advances in Photochemistry*, pages 275–321, Interscience, New York, 1964. Examples of such compounds may be found in U.S. Pat. NOs. 2,305,693; 2,305,799; 3,328,466; and 3,328,182. Although the choice of photoresponsive compositions is not critical to the present invention, a preferred photochromic compound is 6'-nitro benzoindolinopyrano spirane.

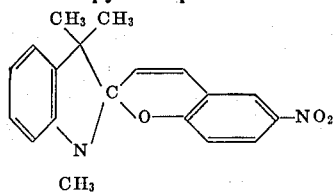

This compound becomes colored upon exposure to actinic radiation at 3,660 A and reverts to the original substantially colorless state upon subsequent exposure to actinic radiation at 5,600 A or upon exposure to a temperature of 96° C. for about 25 seconds.

Figure 3:
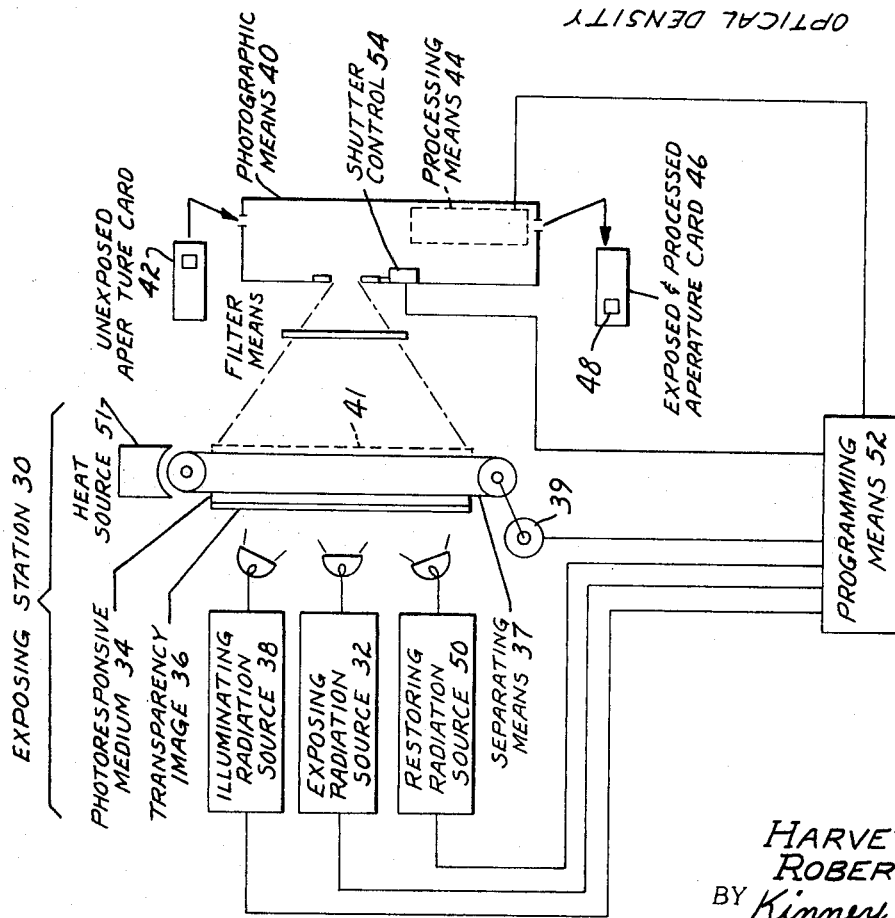
FIG. 3 is a diagrammatic representation of an apparatus used to practice the process of the present invention.

FIG. 3 illustrates one embodiment of apparatus for practicing the method of the present invention. An exposing station 30 is provided which has a source of exposing actinic radiation 32 (for example, a mercury vapor lamp, which emits radiation at a wavelength of 3,600 A) and a photoresponsive medium 34 which becomes colored when struck by actinic radiation from source 32. The photoresponsive medium 34 is preferably a photochromic medium, permitting restoration and reuse thereof. For example, a photochromic medium which contains 6'-nitro benzoindolinopyrano spirane as the reactive compound will undergo a color change by exposure to radiation from the above-mentioned mercury vapor lamp, and may then be restored to its original state by exposure to radiation at 5,600 A or by heating.

Transparency image 36 is positioned between actinic radiation source 32 and photoresponsive medium 34 to receive radiation from source 32 and to differentially transmit the radiation to impinge upon the photoresponsive medium 34, forming thereon a reversed image of the transparency image 36. The imaging material of transparency image 36 must be less transmissive of actinic radiation generated from source 32 than is the transparency image substrate. For example, the transparency image comprising metallic silver imaging material on cellulose triacetate film may be selected for use with the above-mentioned mercury vapor lamp, since cellulose triacetate is more highly transmissive of actinic radiation at 3,660 A than is metallic silver.

Separating means 37 may be operatively coupled to photoresponsive medium 34 (as shown in FIG. 3) or to transparency image 36 to separate transparency image 36 from photoresponsive medium 34 after formation of a reversed image thereon. As an example of a separating means is the conveyer belt assembly of FIG. 3 operated by motor 39. It is contemplated that other separating means may be used equally as well, for example, subsequent to the formation of the reversed image thereon, photoresponsive medium 34 may be transported by separating means 37 to a position indicated by 41 in FIG. 3.

An illuminating radiation source 38 is positioned relative to the photoresponsive medium 34 to illuminate the reversed image formed thereon. The illuminating radiation source 38 is selected to emit actinic radiation at a wavelength to which the reversed image is at least partially photoabsorptive. For example, radiation source which emits actinic radiation at 5,600 A, may be used to illuminate a photochromic medium containing 6'-nitro benzoindolinopyrano spirane. The quantity of radiant energy required for illumination is insignificant compared to the quantity of radiant energy required to restore a photochromic medium to its original state.

Hence the quantity of radiant energy required for illumination does not cause significant deterioration of the reversed image.

Photographic means 40 which contains photographic negative film is positioned relative to the photoresponsive medium 34 for photographing the illuminated reversed image thereon to produce a reduced, unreversed latent image of the transparency image 36 on image photographic negative film, using common photographic optical image-reduction techniques. The photographic means 40 preferably is adapted to utilize photographic negative film known as microfilm. In a preferred embodiment, the photographic means 40 is a camera such as a 3M No. 2000 Processor Camera (Minnesota Mining and Manufacturing Company) which is adapted to accept an unexposed, photographic-negative, film-containing aperture card 42, for example 3M Brand Camera Cards (Minnesota Mining and Manufacturing Company).

A processing means 44 is positioned relative to the photographic means 40 to receive therefrom the photographic negative film bearing the latent, reduced, unreversed image of transparency image 36 and to process the latent image to produce a reduced, unreversed reproduction of the transparency image 36. The processing means 44 includes at least development means and preferably further includes fixing or stabilizing means if photographic negative film of the silver halide type is utilized.

In a preferred embodiment, the photographic means 40 and processing means 44 are combined into a single unit, such as 3M 2000 Processor Camera (Minnesota Mining and Manufacturing Company) which images and processes the above-mentioned aperture card 42 to yield an aperture card 46 containing photographic negative film 48 bearing a reduced, unreversed reproduction of the transparency image 36.

If the photoresponsive medium 34 is photochromic, restoring means, represented by restoring radiation source 50, is advantageously incorporated in the above apparatus. Restoring radiation source 50 may, for example, be adapted to irradiate the imaged photoresponsive medium 34 with actinic radiation at a wavelength which causes the imaged photoresponsive medium to be substantially restored to its original photoresponsive state. For example, restoring means emitting actinic radiation at 5,600 A may be used to cause restoration of the above-mentioned photochromic medium containing 6'-nitro benzoindolinopyrano spirane. The restoring radiation source 50 and the illuminating means 38 may be a single radiation source. In a preferred embodiment, however, the restoring means is a heat source 51 adapted to receive the photochromic medium 34 bearing a reversed image and to heat the photochromic medium 34 at a sufficient temperature and for sufficient time to substantially restore the photochromic medium to an unimaged state. It is contemplated that the photochromic medium 34 may be supplied as a continuous sheet in roll form so that a fresh length of photochromic medium may be advanced for each image sequence, the used photochromic medium being collected in roll form. Upon exhaustion of the supply of fresh photochromic medium, the roll of used photochromic medium may be substantially restored to its original un-imaged state by heating.

Although the above-described apparatus may be manually operated, it is preferred that programming means 52 be incorporated therein to automatically operate at least two of the elements of the apparatus in sequential order. FIG. 3 shows programming means operatively coupled to actinic radiation source 32, separating means 37, illuminating radiation source 38, shutter control 54, restoring radiation source 50 and processing means 44.

Filter means positioned relative to the photographic means may be advantageously incorporated within the above described apparatus to filter the actinic radiation which exposes said photographic negative film, thereby permitting the contrast of the reduced, unreversed reproduction of the transparency image to be varied as desired. For example, a Wratten No. 57 Eastman Kodak filter which has maximum transmission at 5,300 A units may be employed in the above-mentioned apparatus wherein the illuminating radiation is at a wavelength of 4,000 A to 7,000 A and the photochromic medium contains 6'-nitro benzoindolinopyrano spirane.

Reduced, unreversed photographic image reproductions obtained by the method of the present invention may be advantageously viewed in enlarged size by projecting the photographic image unto a viewing surface using known slide projector techniques. It is contemplated that viewing means, such as a slide projector adapted for use with the unreversed image reproductions of the present invention, may be incorporated into the apparatus of the present invention to provide means for quickly checking the faithfulness of the reduced, unreversed photographic reproduction.

The present invention may be more easily understood by reference to the following example which is presented for illustrative purposes only and which should not be construed as limiting the scope of the present invention.

EXAMPLE 1

A photochromic medium was prepared by coating onto a polyester film having a thickness of 0.051 mm. a solution consisting of 2.0 grams of 6'-nitro benzoindolinopyrano spirane

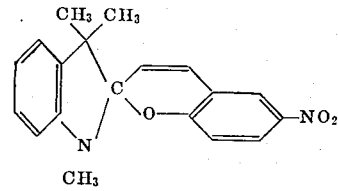

8.0 grams of ethyl cellulose ("Ethocel," Hercules Powder Co.) and 90 ml. of methyl ethyl ketone to yield, after drying, a coating thickness of 0.023 mm.

The photochromic medium was placed in facing contact with a 14 × 17 inch chest X-ray and was exposed through the chest X-ray for 25 seconds to radiation from a 750-watt mercury arc source at a distance of 5 inches. A reversed image of the chest X-ray was obtained on the photochromic medium. The reversed image was then illuminated by radiation by G.E. "Cool White" fluorescent lamps (General Electric Co.) at a distance of 12 inches and was photographed with a camera adapted to accept photographic negative film attached to an aperture card, expose the film, process the latent image, and eject the aperture card bearing a reversed image of the object which was photographed (3M Co. Filmsort No. 2000 Processor Camera, Minnesota Mining and Manufacturing Company, Incorporated). An unreversed, reduced reproduction of the chest X-ray which exhibited excellent resolution and contrast was thus obtained on photographic negative film.

The photochromic medium was then heated at 95° C. for 30 seconds to cause the medium to revert to substantially its original unimaged state. This medium was then used in the above process to yield another reversed, reduced microfilm reproduction of the chest X-ray having similarly excellent characteristics.

What is claimed is:

1. A method for producing a reduced, unreversed reproduction of a transparency image on photographic negative film comprising the steps of:
   irradiating one surface of a transparency image with actinic radiation having sufficient energy to be differentially transmitted therethrough to impinge upon a photochromic medium positioned in facing engagement therewith and to form on said photoresponsive medium a reversed image of said transparency image,
   separating said transparency image from facing engagement with said medium, illuminating said photochromic medium bearing said reversed image with radiation at a wavelength which is differentially absorbed by said photochromic medium, photographing said illuminated reversed image onto photographic negative film to form thereon a reduced, unreversed latent image of said transparency image, and processing said latent image to produce on said photographic negative film a reduced, unreversed reproduction of said transparency image.

2. The method of claim 1 wherein said photoresponsive medium is a photochromic medium and further comprising the step of:

irradiating said photochromic medium with actinic radiation having a preselected wavelength to substantially restore said photochromic medium to an unimaged photosensitive state to enable reuse of said photochromic medium, said irradiating step being performed subsequent to said photographing step.

3. The method of claim 1 wherein said photoresponsive medium is photochromic and further comprising the step of:

heating said photochromic medium at a predetermined temperature for a sufficient time to substantially restore said photochromic medium to its unimaged photosensitive state after said photographing step.

4. A method for producing a reduced, unreversed reproduction of a radiograph on a microfilm portion of an aperture card comprising the steps of:

positioning said radiograph in facing contact with a photochromic medium, irradiating one surface of said radiograph with actinic radiation having sufficient energy to be differentially transmitted therethrough to impinge upon said photochromic medium and to form thereon an unreduced, reversed image of said transparency image, separating said radiograph from facing engagement with said medium, illuminating one surface of said photochromic medium bearing said reversed image at a wavelength which is differentially absorbed by said photochromic medium, photographing said illuminated reversed image onto microfilm to form thereon a reduced, unreversed latent image of said radiograph, and processing said latent image to produce on said microfilm a reduced, unreversed reproduction of said transparency image.

5. The method of claim 4 additionally comprising the step of displaying said reduced, unreversed image as an enlarged unreversed image on a viewing surface by optical projection of said reduced, unreversed microfilm image.

6. The method of claim 4 wherein said steps are programmed to automatically occur in sequential order.

7. Apparatus for producing a reduced, unreversed reproduction of a transparency image on photographic negative film comprising:

an exposing station having an actinic radiation source and a photochromic medium, said exposing station being adapted to receive said transparency image in facing contact with said medium and positioned relative to said source to permit said actinic radiation to be differentially transmitted through said transparency image to impinge upon said medium and to form thereon a reversed image of said transparency image, illuminating means positioned relative to said medium for illuminating said reversed image after separation therefrom of said transparency image at a wavelength which is at least partially absorbed by said reversed image, photographic means employing photographic negative film positioned relative to said medium for photographing said illuminated reversed image to produce a reduced, unreversed latent image of said transparency image on said film, and processing means adapted to receive said photographic negative film bearing said latent image for processing said latent image to produce on said photographic negative film a reduced, unreversed reproduction of said transparency image.

8. The apparatus of claim 7 further comprising means for separating said transparency image from said photoresponsive medium after formation of said reversed image.

9. Apparatus for producing a reduced, unreversed reproduction of a radiograph on microfilm comprising:

an exposing station having an actinic radiation source and a photochromic medium, said exposing station being adapted to receive said radiograph in an aligned relationship with said photochromic medium and positioned relative to said source to permit said actinic radiation to be differentially transmitted through said radiograph to impinge upon said photochromic medium and form thereon a reversed image of said radiograph, illuminating means positioned relative to said photochromic medium for illuminating said reversed image after separation therefrom of said radiograph at a wavelength which is at least partially absorbed by said reversed image, photographic means containing microfilm attached to an aperture card and positioned relative to said photochromic medium for photographing said illuminated reversed image to produce a reduced, unreversed latent image of said radiograph on said microfilm, and processing means operatively coupled to said photographic means to receive said imaged microfilm for processing said latent image thereon to produce on said microfilm a reduced, unreversed reproduction of said radiograph.

10. The apparatus of claim 9 additionally comprising separating means for separating said radiograph and said photochromic medium after formation of said reversed image.

11. The apparatus of claim 10 wherein said apparatus further comprises:

restoring means positioned relative to said photochromic medium and capable of irradiating said photochromic medium at a wavelength to substantially restore said medium to an unimaged state.

12. The apparatus of claim 10 wherein said apparatus further comprises:

restoring means adapted to receive said photochromic medium bearing said reversed image and capable of heating said photochromic medium to a predetermined temperature for a sufficient period of time to substantially restore said medium to its unimaged state.

13. The apparatus of claim 10 further comprising:
control means operatively coupled to said exposing station, said separating means, said illuminating means, said photographic means, said processing means, and said restoring means for programming operation thereof in a sequence which exposes said medium, illuminates said reversed image, photographs said reversed image, develops said imaged photographic negative film, and restores said photochromic medium to its unimaged state.

14. The apparatus of claim 10 further comprising:
filter means positioned relative to said photographic means for filtering said illuminating radiation to vary contrast of said reduced, unreversed reproduction of said transparency image produced on said film.

15. The apparatus of claim 10 further comprising:
display means positioned relative to said processing means to receive therefrom said aperture card bearing said reduced, unreversed reproduction of said radiograph on microfilm, and optically projecting said reduced, unreversed image onto a viewing surface to produce an unreversed, unreduced image reproduction of said radiograph.

* * * * *